Oct. 15, 1929.     S. N. HURT     1,732,163
WEIGHING SCALE
Filed Feb. 4, 1925
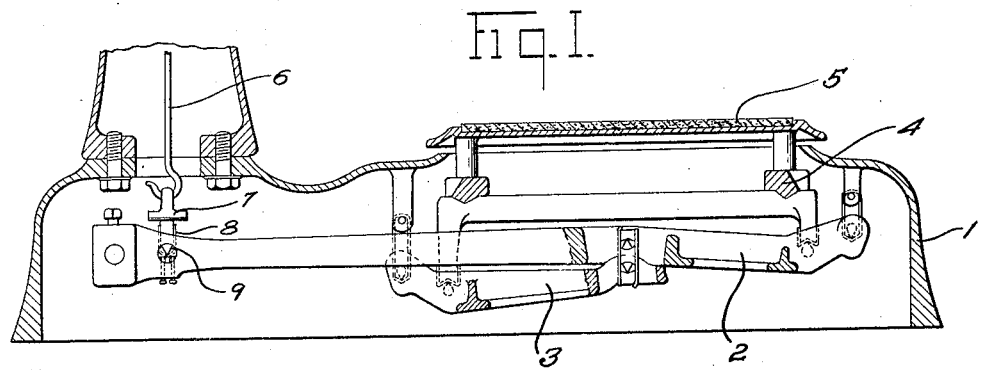
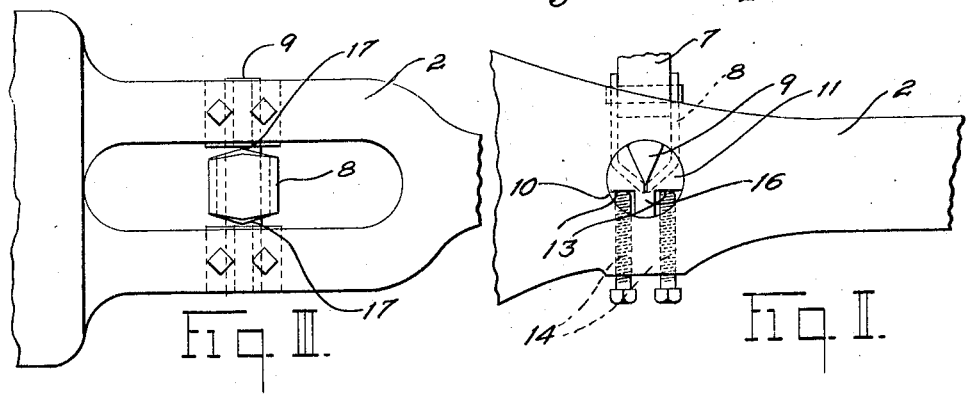
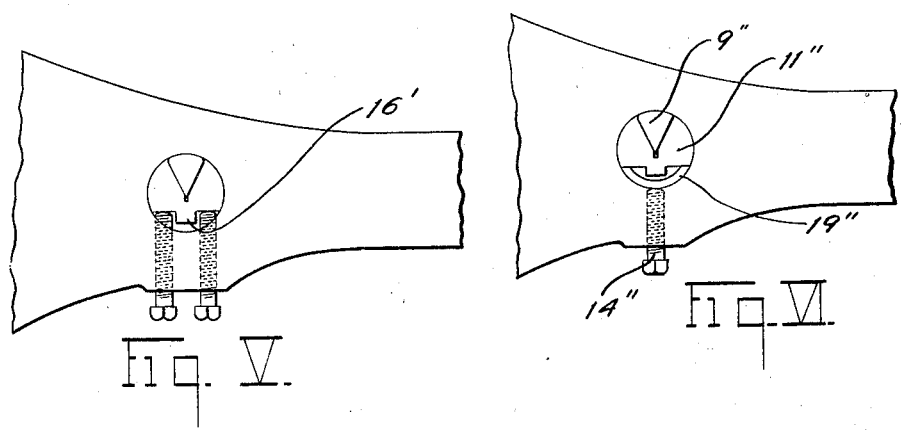
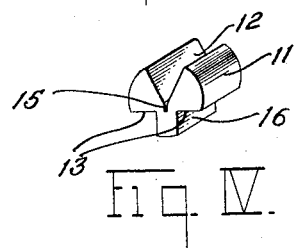
Inventor
Samuel N. Hurt
By C. C. Marshall
Attorney Patented Oct. 15, 1929

1,732,163

UNITED STATES PATENT OFFICE

SAMUEL N. HURT, OF TOLEDO, OHIO, ASSIGNOR TO TOLEDO SCALE COMPANY, OF TOLEDO, OHIO, A CORPORATION OF NEW JERSEY

WEIGHING SCALE

Application filed February 4, 1925. Serial No. 6,879.

This invention relates to weighing scales, and more particularly to means for fixedly retaining a pivot in place in a scale element.

One of the principal objects is to provide a suitable retainer for a pivot which may be positioned within a bore in the lever or other scale element.

Another object is the provision of a means for so securing a pivot in a lever that it may be readily removed or replaced without the use of special tools.

Still another object is to provide means whereby the distances between pivots may be very accurately adjusted and securely locked in adjusted position.

Other objects and advantages will be apparent from the following description, in which reference is had to the accompanying drawings illustrating preferred embodiments of my invention and wherein similar reference numerals designate similar parts throughout the several views.

In the drawings:—

Figure I is a sectional elevational view through the base of a weighing scale showing a preferred means for securing a knife edge pivot in a lever;

Figure II is an enlarged fragmentary elevational view of a portion of a lever showing the pivot retaining means of my invention;

Figure III is a bottom plan view of that portion of the lever illustrated in Figure II;

Figure IV is an isometric perspective view of the preferred form of the pivot retaining device;

Figure V is a view similar to Figure II showing a slightly modified form of my invention;

Figure VI is another view similar to Figure II showing a different means for fixedly securing the pivot retaining means in position.

Referring to the drawings in detail, I have illustrated the pivot retainer of my invention as used in connection with a scale lever; however, it is to be understood that it is also adaptable for use in securing pivots to other members—for example, pendulums and other scale elements.

As the portion of the scale illustrated forms no part of my invention per se, I will only describe it in such detail as will suffice to show the connection of my invention thereto. The base 1 of the scale is adapted to house and support levers 2 and 3 upon which is supported a platform spider 4 surmounted by the load-receiving platform 5. The lever 2 is provided with an extension which is adapted to be connected to some suitable form of load-counterbalancing mechanism (not shown) through the medium of the rod 6. The rod 6 is provided with a hook adapted to engage an eye in a member 7, to which is pivotally connected a stirrup 8, the bight of the stirrup engaging a pivot 9 carried by the lever 2.

In order to reliably secure the pivot in the lever, I have provided the lever with a transverse bore 10 adapted to receive a retaining member 11 having certain surfaces thereof cylindrical and which substantially fit the walls of the bore 10. The member 11 is provided with a V-shaped groove 12, the apex of which may be at the center of curvature of the cylindrical surfaces; however, the apex is preferably off of the center of curvature, as illustrated in the drawings, for a purpose to be hereinafter explained. In the assembly of the pivot retaining device the retaining member 11 is first inserted in the bore of the lever and the knife edge pivot bar 9 placed in the V-shaped groove 12. The lever 2 is also provided with a pair of threaded openings in the lower side thereof leading to the bore 10 which are adapted to receive screws 14, the inner ends of the screws engaging certain flat or wall portions of spaced grooves 13 in the retaining member 11.

As the pivot bar 9 fits the walls of the groove 12 very snugly and the apex of said groove is not coincident with the center of curvature, it will be apparent that the pivot edges will not be coincident with the axis of the bore in the lever but radially spaced therefrom so that by skillful manipulation of the screws 14 the retaining member 11 and pivot bar 9 may be rotated in the bore to change the position of the pivot edge relative to other pivot edges in the lever.

The apex of the groove 12 is preferably terminated into a kerf 15 and the amount of metal between the kerf 15 and the apices of the grooves 13 decreased, so that the screws 14 in forcibly engaging the walls of the groove 13 cause a slight deformation in portions of the retaining member 11 adjacent the pivot, so that the latter is wedgingly and firmly held in place. Upon releasing the screws 14, however, the pivot may be easily removed, if desired, for purposes of replacement or repair.

The projection 16 formed between the grooves 13 of the member 11 serves as a thrust abutment for the stirrup 8 when a load is suddenly removed from the platform and the nose of the lever "jumps" up or when the scale is subjected to shocks which would otherwise cause the thrust points 17 to tend to lodge under the retaining member 11, such a lodgment is prevented by the projection 16.

In the modified form shown in Figure V, the projection 16' is shortened to conserve metal, as it is the usual practice to form the metal in comparatively long bars and to cut the retainers therefrom into desired lengths.

In the modified form shown in Figure VI, I have employed a different means for engaging the retainer 11'', which comprises a circular ring sector 19'' adapted to be engaged by a single screw 14'' threaded into an opening in the lever. In adjusting the pivot the screw 14'' is released and the pivot 9'', retaining member 11'' and sector 19'' are shifted manually to the desired position and the screw again brought into forcible engagement with the periphery of the sector, the ends of the sector serving to deform certain portions of the retainer to wedgingly retain the pivot 9'' in proper position.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a member having a bore therein, a pivot, a pivot retainer mounted in the bore, said pivot retainer having a diametrically opposed recess and projection both within said bore, and means engageable with the retainer on either side of said projection to clamp the pivot in said recess.

2. In a device of the class described, in combination, a member having a bore therein, a pivot retainer mounted in the bore and having a diametrically opposed recess and projection, a knife edge pivot mounted in said recess, the edge of said pivot being eccentric with respect to the bore in said member, and means engaging said pivot retainer on either side of the projection for adjusting said pivot and retainer and locking same in adjusted position.

3. In a device of the class described, in combination, a lever, a pivot retainer adjustably mounted therein, a thrust projection on said retainer, a pivot bar mounted in said retainer, said retainer having a kerf adjacent the edge of said pivot, and means engageable with said retainer on either side of the projection to forcibly retain the pivot in proper position.

4. In a device of the class described, in combination, a member having a bore therein, a pivot retainer mounted in said bore, a pivot bar eccentrically mounted in said pivot retainer and passing through said bore, a projection on said pivot retainer, and means engageable with said retainer on either side of said projection for adjusting and locking said pivot retainer and pivot bar in adjusted position.

5. In a device of the class described, in combination, a member having a bore therein, a pivot, a pivot retainer mounted in said bore, said retainer having a recess adapted to receive the pivot, and means including a circular ring sector for deforming said pivot retainer to clamp said pivot in said recess.

6. In a device of the class described, in combination, a member having a bore therein, a pivot retainer mounted in said bore, a pivot bar eccentrically mounted in said pivot retainer, a circular ring sector engaging said pivot retainer at separated points, and means engaging said sector for clamping said pivot retainer and said pivot bar in place.

SAMUEL N. HURT.